United States Patent [19]

Jenkins

[11] Patent Number: 5,779,991

[45] Date of Patent: Jul. 14, 1998

[54] APPARATUS FOR DESTROYING HAZARDOUS COMPOUNDS IN A GAS STREAM

[75] Inventor: George M. Jenkins, Hatfield Point, Canada

[73] Assignee: Eastern Digital Inc., Fredericton, Canada

[21] Appl. No.: 746,323

[22] Filed: Nov. 12, 1996

[51] Int. Cl.$^6$ ................................................ B01J 19/08
[52] U.S. Cl. ........................... 422/186.21; 422/186.04; 422/906; 588/227; 588/243
[58] Field of Search ............................ 588/210, 212, 588/227, 219, 222, 225, 243, 247; 422/186.21, 186.04, 906

[56] References Cited

U.S. PATENT DOCUMENTS

| | | | |
|---|---|---|---|
| 3,051,639 | 8/1962 | Anderson | 204/172 |
| 3,205,162 | 9/1965 | MacLean | 422/186.04 |
| 3,332,870 | 7/1967 | Orbach et al. | 422/186.21 |
| 3,526,081 | 9/1970 | Kusters . | |
| 4,566,961 | 1/1986 | Diaz et al. | 204/172 |
| 4,735,633 | 4/1988 | Chiu . | |

FOREIGN PATENT DOCUMENTS

CA 1282732  4/1991  Canada .

*Primary Examiner*—Kathryn L. Gorgos
*Assistant Examiner*—Kishor Mayrkar
*Attorney, Agent, or Firm*—Mario D. Theriault

[57] ABSTRACT

An apparatus having a first and second zones, for destroying hazardous compounds of a first and second types respectively present in a gas stream. The first zone has a first live electrode and a ground electrode. The first live electrode and the ground electrode define a first gas passage. These electrodes are excitable at a first energy level for generating a first electric field capable of generating a plasma in a gas flowing through the first gas passage. The second zone has a second live electrode spaced apart from the ground electrode. The second live electrode defines with the ground electrode a second gas passage communication with a downstream end of the first gas passage. The second live electrode is excitable at a second energy level for generating with the ground electrode a second electric field capable of sustaining the plasma in the gas flowing through the second gas passage. The second live electrode is located within electrically excitable distance from the first live electrode, whereby when the first energy level is different from the second energy level, either in their respective voltages, phases or frequencies, a third electric field is generated between the first and second live electrodes. This third electric field provides an additional source of energy between the first and second electric fields for sustaining the plasma throughout both zones, and for preventing a backward recombination of the hazardous compounds of the first type leaving the first zone.

20 Claims, 6 Drawing Sheets

APPARATUS FOR DESTROYING HAZARDOUS COMPOUNDS IN A GAS STREAM

FIELD OF THE INVENTION

This invention relates to an apparatus for destroying hazardous or toxic compounds in a gas stream using electrical field energy. More particularly, this invention relates to an apparatus for destroying materials of a first type in a first zone thereof, and for destroying materials of a second type in a second zone thereof, using a plurality of electric fields for generating and sustaining a plasma throughout the first and second zones.

BACKGROUND OF THE INVENTION

Hazardous compounds are often present in waste industrial gases, and especially in the waste gases of semiconductor manufacturing operations. A chemical vapour deposition (CVD) process, for example, is generally used to deposit layers of conductive and dielectric materials on a substrate. In this industry, chemical vapours are also used for etching structures on previously generated materials.

In a first example of a semiconductor manufacturing operation, silane ($SiH_4$) and ammonia ($NH_3$) are often combined to deposit a thin film of silicon nitride ($Si_3N_4$) on a semiconductor wafer. The exhaust gases from this process frequently contain residual silane and ammonia.

Furthermore, the operators of CVD processes often use a volume of ammonia which is greater than that required by the stoichiometry of the reaction. This excess volume of ammonia enhances several properties of the deposited film. Accordingly, operators of CVD processes for depositing silicon nitride on various substrates tend to provoke chemical reactions similar to those depicted below:

$$3SiH_4+12NH_3 \rightarrow Si_3N_4+12H_2+8NH_3$$

$$3SiH_4+28NH_3 \rightarrow Si_3N_4+12H_2+24NH_3$$

Similarly, a CVD process for depositing silicon oxynitride on semiconductor wafers uses compositions which are characterized by the following equations, where the first equation is a general representation and the second one gives an expected result:

$$20SiH_4+102NH_3+54N_2O+54N_2 \rightarrow$$

$$2Si_{10}O_xN_y+(102-2y)NH_3+(54-2x)N_2O+(54+2x)N_2+3yH_2$$

$$20SiH_4+102NH_3+54N_2O+54N_2 \rightarrow$$

$$2Si_{10}O_8N_8+86NH_3+38N_2O+70N_2+24H_2$$

Although the leftover ammonia in the exhaust of these reactions is not as environmentally unsafe as other associative compounds, it must be destroyed with all the other hazardous gases before the exhaust is released into the atmosphere.

Several apparatus of the prior art have been designed to destroy post reaction gases from a CVD treatment process. A first example is described in the Canadian Patent 1,282,732, issued on Apr. 9, 1991 to L. A. Danisch, G. M. Jenkins, E. E. Wallingford and Y. E. Moharir. This patent describes a post reaction chamber wherein post reaction gases from a CVD treatment process are treated by radio frequency plasma. The energy from the plasma causes the formation of less hazardous compounds from the gases, and causes the deposition of some of these less hazardous compounds on one or more of the interior surfaces of the chamber within which the plasma is formed. This type of apparatus has been successfully used to destroy Silane, Diborane, Tetraethylorthosilicate, Disilane, Phosphine, Arsine and the like.

In a second example, U.S. Pat. No. 4,735,633, issued on Apr. 5, 1988 to K. C. R. Chiu, discloses a method and system for extracting vapour phase waste species from a gas stream. In this apparatus the electrodes have a large area relative to the reactor internal surfaces. The apparatus also has a relatively long flow path between the electrodes. Together, the lengthy flow path and the high ratio of electrode area assure vapour extraction efficiencies in excess of about 75 mole %.

The plasma treatment chambers of the prior art generally comprise two spaced apart electrodes. The electrodes are energized at frequencies and voltages sufficient to form an electric field therebetween; to increase the energy level of the waste gases; to fragment the hazardous compounds, and to produce species which are usually attracted to the inside surface of the chamber. The particles accumulating on the wall of the chamber sometimes eventually flake off and are collected at the bottom of the treatment chamber.

In both the above examples, the plasma reactors are designed to treat compounds which can be readily fragmented, and transformed into products which can be ionized and attracted to one of the electrodes of the plasma reactor. It is known for example, that the bond energy between hydrogen and nitrogen is higher than the bond energy between hydrogen and silicon. Hence, silane for example, is treatable in a plasma reactor with less energy than the amount of energy required to treat ammonia. The decomposition of silane and the recomposition of its fragments into electrically chargeable products inside a plasma reactor, firstly absorbs a larger portion of the energy in the electric field of this reactor. The treatment of compounds having a stronger electrical bond is consecutively effected in a plasma which is partly depleted from its initial intensity. Accordingly, it has been found that the treating of ammonia in a plasma reactor in the presence of other more reactive materials, is often incomplete.

Ammonia is better treated in a plasma reactor by adding oxygen to the plasma for capturing the hydrogen component. Water vapour is thus formed, preventing the recombination of hydrogen with nitrogen. The inconvenience, however, is that when oxygen is introduced in a plasma treatment chamber where silane is present for example, the oxygen element tends to firstly combine with silane to form silicon dioxide and hydrogen, also leaving ammonia unaltered. This reaction is explained below:

$$SiH_4+NH_3+O_2 \rightarrow SiO_2+2H_2+NH_3$$

For these reasons, the plasma reactors of the prior art have had a limited success in completely destroying the ammonia present in the post reaction gases of a semiconductor manufacturing process.

SUMMARY OF THE INVENTION

In the present invention, however, there is provided an apparatus having a first zone for destroying materials of a first type, and a second zone for destroying materials of a second type. More specifically, the materials of the first and second types which are referred to herein, differ from one-another in the magnitude of their respective bond energy; in their respective attraction, or in the attraction of their respective products to a charged electrode; in their respective ability to produce stable and less hazardous compounds; or in any combinations of the above characteristics.

In accordance to one aspect of the present invention, the first zone of the apparatus has a first live electrode and a ground electrode. The ground electrode is spaced apart from the first live electrode and defines with the first live electrode a first gas passage.

The first live electrode and the ground electrode are excitable at a first energy level to generate a first electric field capable of generating a plasma in a waste gas flowing through the first gas passage. This first electric field is further capable of increasing the energy level in the waste gas for treating the materials of the first type present in this waste gas.

The second zone of the apparatus of the present invention has a second live electrode spaced apart from the ground electrode, and defining with the ground electrode a second gas passage communicating with the downstream end of the first gas passage. The second live electrode is excitable at a second energy level for generating with the ground electrode a second electric field capable of sustaining the plasma in the waste gas flowing through this second gas passage. This second electric field is further capable of increasing the energy level in the waste gas for treating the materials of the second type present in the waste gas.

The second live electrode is further located within an electrically excitable distance from the first live electrode, whereby when the first energy level is different from the second energy level, either in their respective voltages, phase angles or frequencies, a third electric field is generated between the first and second live electrodes. This third electric field is generated in a region between the first and second gas passages.

An advantage of the present invention is that a material of the first type is destroyable in the first zone having a first electric field of the first energy level, and a material of a second type is destroyable in the second zone having the second electric field of the second energy level. The third electric field provides an energy bridging effect between the first and second electric fields, to sustain the plasma throughout both zones, and to prevent a backward recombination of the material of the first type leaving the first zone.

In accordance to another aspect of the present invention, a reagent inlet tube is provided in the second zone of the apparatus, for introducing into the second zone, a selective gas to control the transformation of a hazardous material of the second type into stable and environmentally safer substances.

In this other aspect of the present invention, the second live electrode is a hollow cylindrical element, and the reagent inlet tube is located within this hollow cylindrical element. The reagent inlet tube has a discharge end extending into the third electric field, and into an electrically excitable proximity from the first live electrode. The reagent inlet tube is structurally connected to the ground electrode, whereby a fourth electric field is generated between the discharge end thereof and the first live electrode. This fourth electric field also encloses the discharge end on the reagent inlet tube.

Consequently, the reagent is introduced in a region where the electric field density is relatively high. The reagent is thereby effectively and quickly charged to an intense energy level to facilitate its bonding to the elements of the plasma entering the second zone of the apparatus of the present invention.

In accordance to yet another aspect of the present invention, the second gas passage has a cross-section which is smaller than a cross-section of the first gas passage. The gas entering the second zone is thereby compelled into an accelerating condition, creating a region of reduced pressure at the inlet end of the second gas passage.

The discharge end of the reagent inlet tube is located within this region of reduced pressure, and has an opening oriented in a counterflow direction relative to the flow of gas entering this second gas passage. The reagent is thereby homogeneously diffused into the plasma thereby increasing the efficiency of the chemical reaction occurring in the second zone.

The successive destruction of hazardous materials of the first and second types is thereby effected in the apparatus of the present invention, by selectively varying the intensity of the electric fields throughout the plasma inside both zones, and by optionally introducing an appropriate reagent in a strategic region of this plasma.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
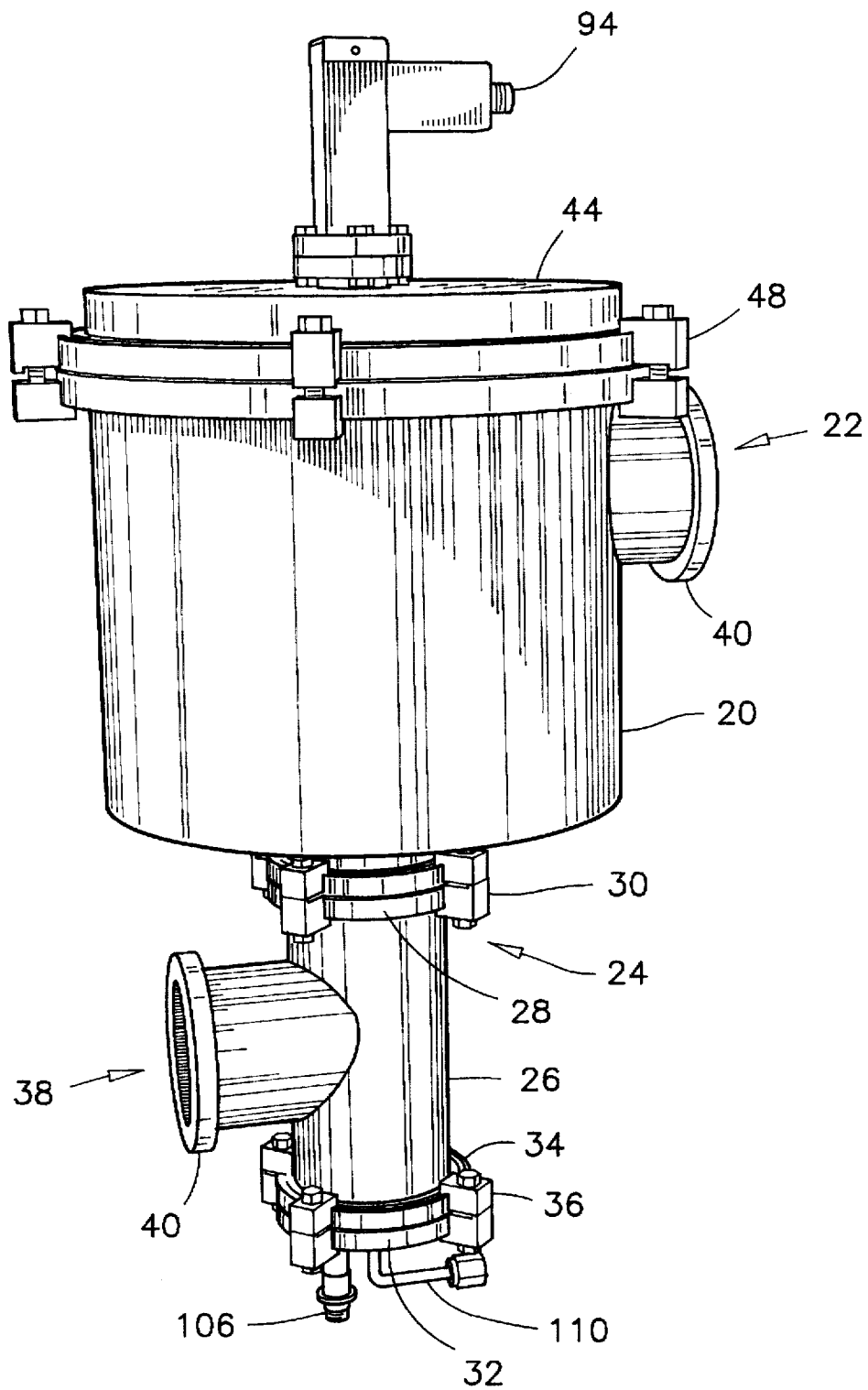
FIG. 1 is a perspective side view of the apparatus of the preferred embodiment of the present invention.
Figure 2:
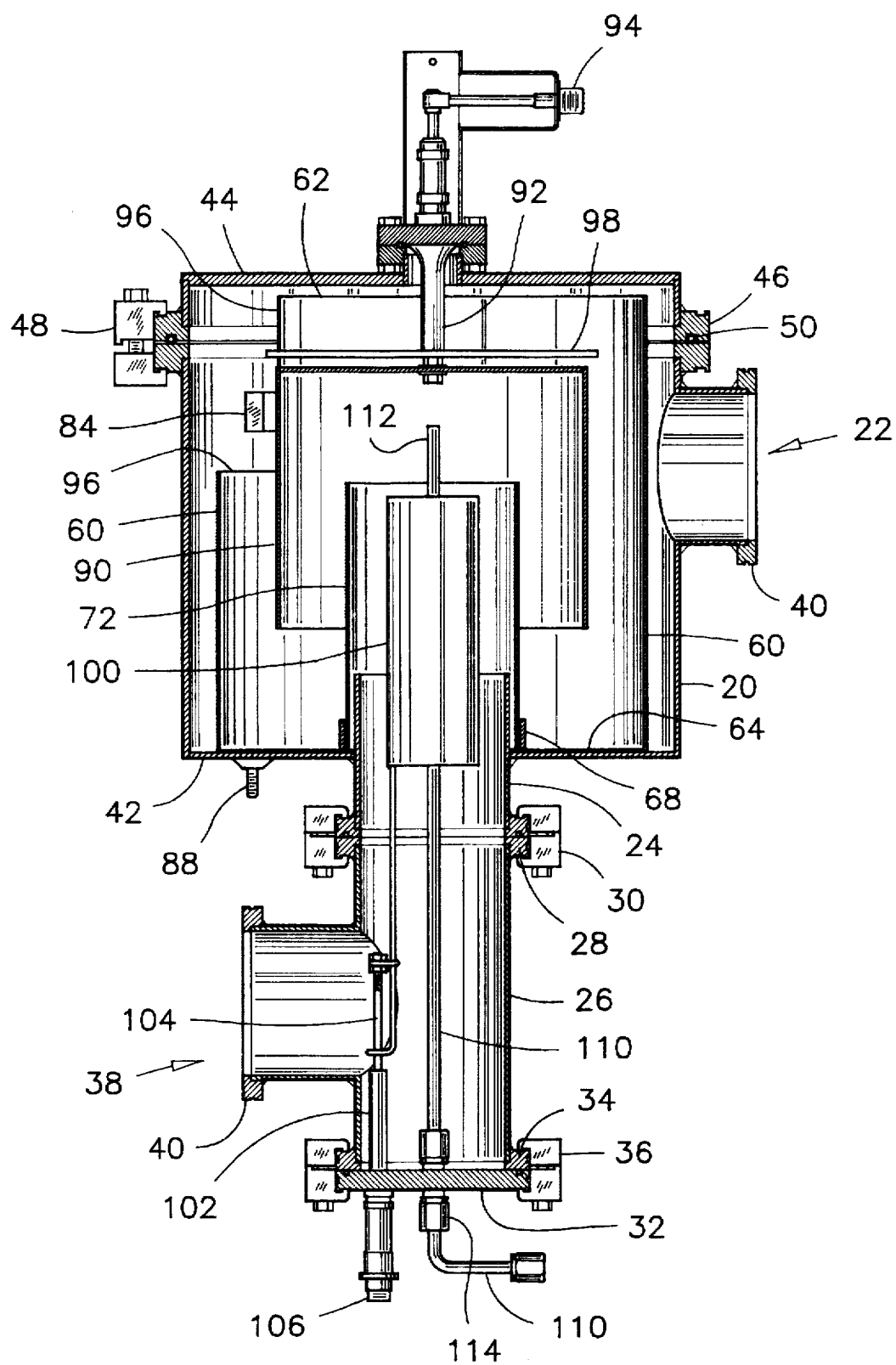
FIG. 2 is a vertical cross-sectional view through a central region of the apparatus of the preferred embodiment.

The apparatus of the preferred embodiment is illustrated in its entirety in FIGS. 1 and 2. The apparatus of the preferred embodiment comprises an outer casing 20 having an inlet opening 22 and an outlet opening 24. The outlet opening 24 is connected to the first opening of a T-extension 26 by means of a first pair of flanges 28 and a first series of C-clamps 30. The T-extension 26 has a second opening aligned with the first opening. This second opening is closed by a removable blank plate 32. This blank plate 32 is retained to the flange 34 of the second opening by means of a second series of C-clamps 36. The T-extension 26 has a third opening 38 which defines with the outlet opening 24, a right angle gas conduit exiting the outer casing 20.

The inlet opening 22 in the outer casing 20, and the third opening 38 of the T-extension 26 are respectively, the inlet opening 22 and discharge opening 38 of the apparatus of the preferred embodiment. The two openings 22, 38 have appropriate flanges 40 or pipe fittings, such that the apparatus of the preferred embodiment can be installed in line with a waste gas exhaust pipe having similar flanges or pipe fittings, for treating the waste gas flowing through that pipe.

The outer casing 20 is preferably a vertical circular casing and the outlet opening 24 is preferably a circular opening through a central region of the bottom wall 42 of the outer casing 20. A removable cover 44 is preferably provided to close an upper end of outer casing 20. The cover 44 is preferably retained along an upper edge of outer casing 20 by means of a pair of flanges 46 and a third series of C-clamps 48.

As it is customary with this type of equipment, the flanges 28, 34, and 46 each have an O-ring 50 for sealing the respective opening defined by these flanges.

Figure 4:
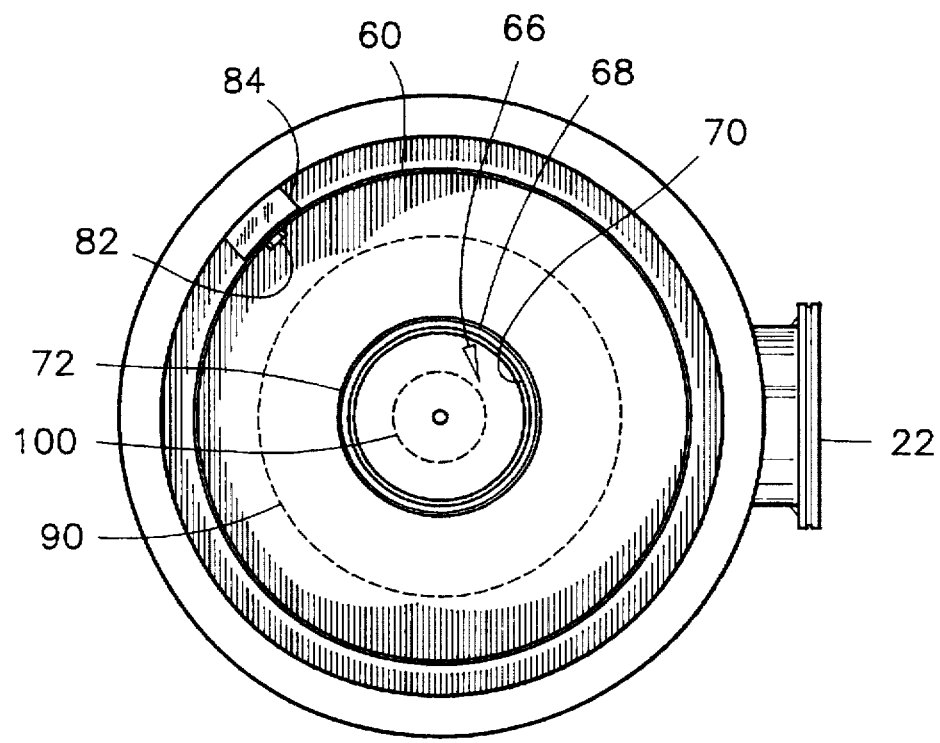
FIG. 4 is a top view of the outer casing of the apparatus, with the cover removed and the first and second live electrodes shown in dashed lines.
Figure 5:
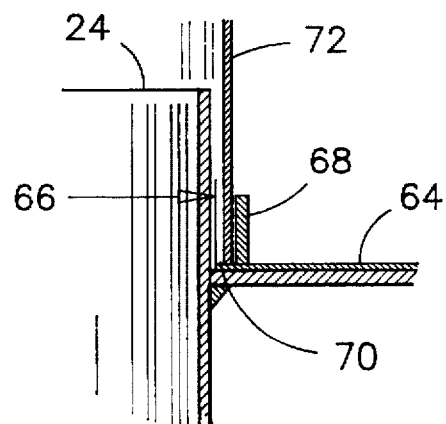
FIG. 5 is an enlarged view of Detail 5 in FIG. 3.

There is provided inside the outer casing 20, a vertically disposed cylindrical element 60 having an opened upper end 62 and a partially closed lower end 64. The partially closed lower end 64 has a circular aperture 66 circling the outlet opening 24. The circular aperture 66 is better seen in FIGS. 3, 4 and 5. A circular lip 68 is also provided around the aperture 66. The circular lip 68 has an inside diameter which is slightly larger than the diameter of aperture 66 such that it forms a circular ridge 70 around the aperture 66. A tubular element 72 is held onto ridge 70 and extends upwards inside the cylindrical element 60 in a coaxial alignment therewith.

Figure 3:
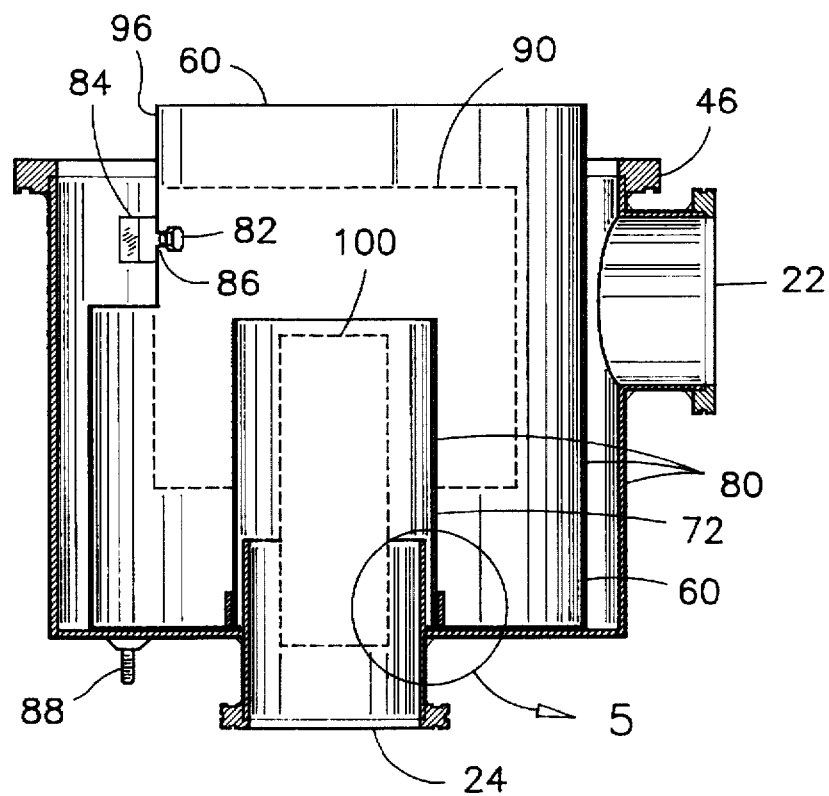
FIG. 3 is also a vertical cross-sectional view of the outer casing of the apparatus of the preferred embodiment, with the first and second live electrodes shown in dashed lines.

Referring now specifically to FIGS. 2 and 3, the cylindrical element 60, the tubular element 72 and the outer casing 20 define altogether the ground electrode 80 of the apparatus of the preferred embodiment. The tubular element 72 is physically supported inside the cylindrical element 60 and is in electrical contact therewith. The cylindrical element 60 is supported inside outer casing 20 and is also in electrical contact therewith.

Figure 7:
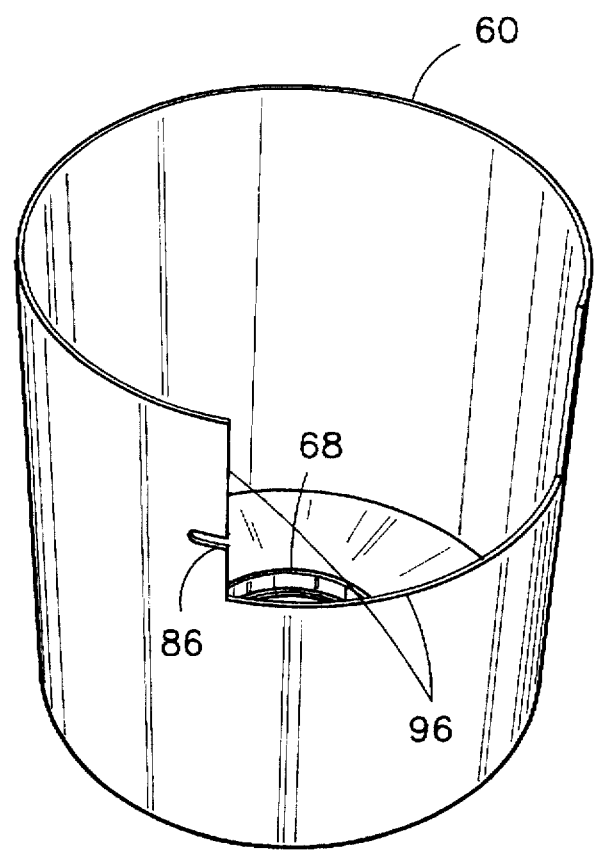
FIG. 7 is a partial perspective side and top view of the ground electrode of the apparatus of the preferred embodiment.

Furthermore, the cylindrical element 60 is mechanically connected to the outer casing 20 by means of a bolt 82, threaded into a block 84 inside the outer casing 20. In this respect, the cylindrical element 60 has a slot 86 for receiving bolt 82, and for facilitating the installation thereof inside the outer casing 20. The slot 86 is better illustrated in FIG. 7. The outer casing 20 has a ground lug 88 which is connectable to an appropriate grounded conductor.

The apparatus of the preferred embodiment also has a first live electrode 90 which is suspended on a first insulated conductor 92 passing through an opening in the cover 44. The first live electrode 90 is excitable from a source of energy of a first energy level through connection 94. The first live electrode 90 preferably has the shape of an inverted circular receptacle suspended inside the cylindrical element 60 and partly enclosing the tubular element 72.

The outside diameter of the cylindrical element 60 is smaller than the inside diameter of the outer casing 20 such that gas entering the apparatus of the preferred embodiment through inlet opening 22 can flows through a gap around the cylindrical element 60. The cylindrical element 60 has an indention 96 in an upper region thereof, in a sector opposite the inlet opening 22. The gas flowing around the cylindrical element 60 is readily admitted inside the cylindrical element 60 through the indention 96.

The respective diameters and lengths of the cylindrical element 60, the first live electrode 90 and the tubular element 72 are different from one-another such that a gap between each of these components define a first gas passage between the ground electrode 80 and the first live electrode 90.

A circular quartz plate 98 is provided between the first live electrode 90 and the cover 44. The primary function of this quartz plate 98, or a plate made with another dielectric material; is to prevent any accumulation of conducting residues on the first insulated conductor 92 of the first live electrode 90. The diameter of the dielectric plate 98 is slightly larger than the diameter of the first live electrode 90. It has been found that during an operation of the apparatus of the preferred embodiment for treating silane for example, the reacted material tends to accumulate on a lower surface of this dielectric plate 98. This material is eventually burned off the edges of the plate 98 by electrical discharges arcing between the first live electrode 90 and the cylindrical element 60, through this accumulated material. This prevents the accumulation of a continuous conductive layer between the first live electrode 90 and the ground electrode 80. The burned and blown particles from this accumulated material fall down on the bottom surface 64 of the cylindrical element 60.

The apparatus of the preferred embodiment has a second live electrode 100 positioned inside the tubular element 72, and in coaxial relation therewith. The second live electrode 100 is also a cylindrical element, and is opened at both ends. The second live electrode 100 is supported by a second insulated conductor 102 passing through the blank plate 32. The position of the second live electrode 100 relative to the first live electrode 90 is adjustable by means of a threaded rod, nuts and ferrules generally designated by label 104, or by other machine element known in the art. The second live electrode 100 is excitable by a second source of electrical energy through the connector 106.

There is also provided, a reagent inlet tubing 110 passing through the blank plate 32, through the second live electrode 100 and along a central axis thereof, and protruding in a gap between the first live electrode 90 and the second live electrode 100. The discharge end 112 of the reagent inlet tubing 110 is adjustable within this gap by means of a slip-through fitting 114 through the blank plate 32. The reagent inlet tubing is desirable for introducing oxygen for example, other oxidizing agent or other mate gas in the second zone of the apparatus of the preferred embodiment, for reacting with the elements of the waste gas flowing through this zone and for producing species which are stable and less hazardous.

It will be appreciated that the first and second live electrodes 90, 100, the ground electrode 80, and all other components of the apparatus of the preferred embodiment which are in contact with the waste gas, are made of a type of metal which is resistant to the corrosive conditions in which the apparatus is intended to operate.

Figure 6:
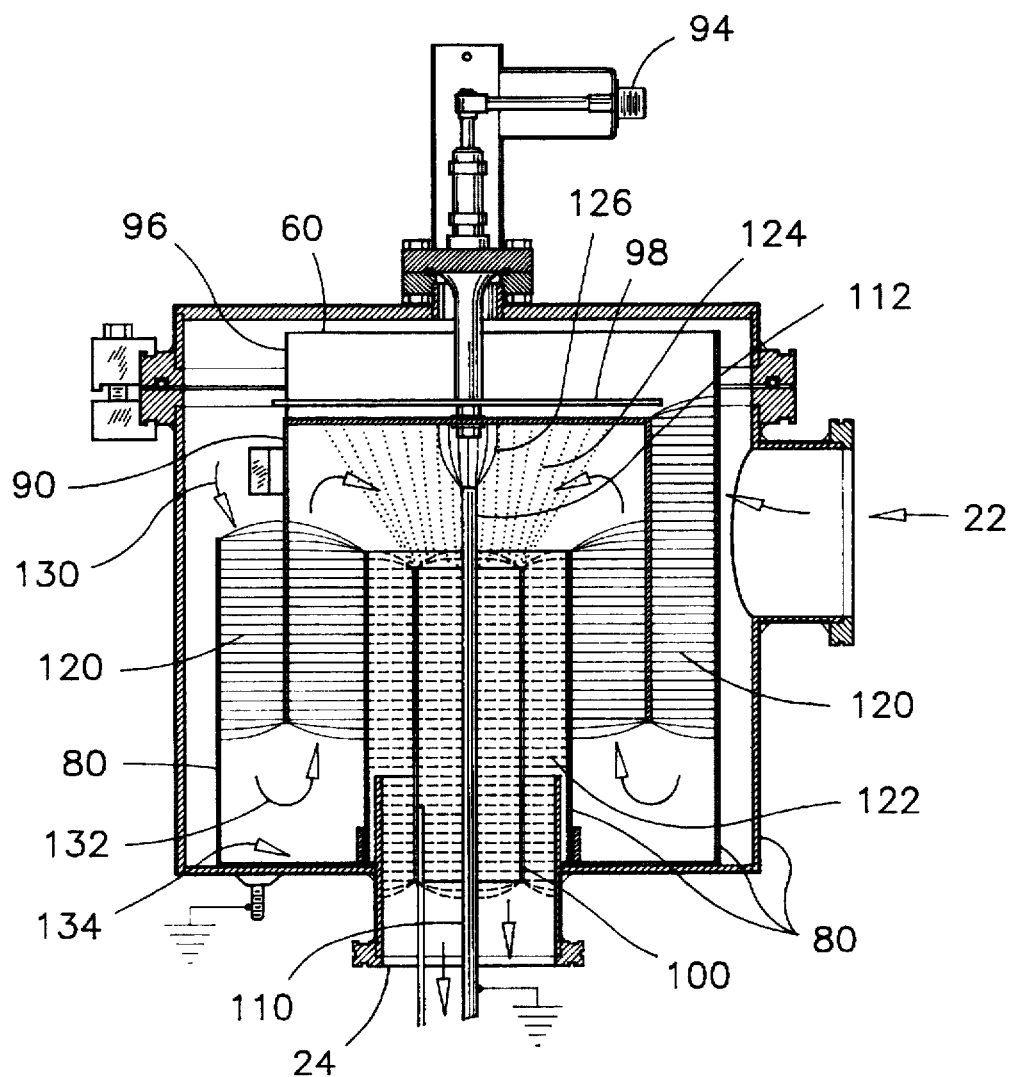
FIG. 6 is a partial view of the vertical cross-sectional view in FIG. 2, illustrating, to all intents and purposes, the scope of the first, second, third and fourth electric fields being generated inside the apparatus of the preferred embodiment, during an operation thereof.

Referring now specifically to FIG. 6, there is illustrated therein, for all practical intents and purposes, the respective scope of the first, second, third and fourth electric fields, labelled 120, 122, 124 and 126 respectively, generated inside the apparatus of the preferred embodiment, during an operation of the apparatus.

When the apparatus of the preferred embodiment is connected to a pipe of waste gas to be treated, and when this waste gas is caused to flow therethrough, the waste gas enters into the ground electrode 80 in a restrictive manner over the upper edge of the cylindrical element 60, and more freely through the indention 96, as is generally illustrated by arrow 130. The gas is circulated downwardly through the first electric field 120, around the lower edge of the first live electrode 90 as shown by arrow 132, and again through the first electric field 120. This downward and upward movement of the gas through the first electric field 120 is generally referred to herein as the first gas passage.

The first electric field 120 is preferably energized at a first energy level, for inducing a plasma in the waste gas and for exciting and reacting for example, materials present in the waste gas which are decomposable and re-combinable into species which are attractable to one of the ground and live electrode 80, 90.

It has been found that gaseous compounds passing through the first electric field 120 are decomposed and reconstructed into vapours and solid particles which are precipitated against the ground electrode 80. It has also been found that a large portion of the charged particles thus formed tend to accumulate kinetic energy from gravity and from the velocity of the moving waste gas, and hit the bottom surface of the ground electrode 80, in a region generally designated by label 134. It has also been found that the charged particles which have sufficient momentum to move upwards and pass completely through the first electric field 120 often hit the upper horizontal surface of the first live electrode 90 and fall back into region 134, or through the tubular element 72 and come to rest against the blank plate 32. Also, it has been found that the charged vapours are caused to deposit against the surfaces of the electrodes 80, 90, and to eventually flake off and also fall down in region 134 or into the tubular element 72 and against the blank plate 32.

For these reasons, the structural arrangement of the ground electrode 80 having two concentric cylindrical elements 60, 72, spaced apart from one-another and having a common circular bottom plate 64, is convenient for accumulating the precipitated residues from the transformed hazardous materials in the gas stream. The cover 44 of the apparatus of the preferred embodiment is also convenient for removing the ground electrode 80 from inside the casing 20 and for periodically cleaning the apparatus of the preferred embodiment.

In the apparatus of the preferred embodiment, the second electric field 122 is generated between the second live electrode 100, and the tubular casing 72 and inlet tube 110, which are an integral part of the ground electrode 80. The region inside the tubular element 72 is generally designated as the second gas passage. The second electric field 122 inside the tubular element is preferably different from the first electric field 120. The second electric field 122 preferably has an energy level to sustain the plasma throughout the second gas passage, and to excite and to react for example, materials which are decomposable and re-combinable into stable and less hazardous compounds. It will be appreciated that the first and second electric fields 120 and 122 of the apparatus of the preferred embodiment may differ in their respective intensity in order to simply decompose materials of a first and second types, having respectively a bond energy of a first and second extents.

The second live electrode 100 is within an electrically excitable distance from the first live electrode 90. Hence, when the first electric field 120 differs from the second electric field 122, either in voltage, in phase angle, or in the absence of harmonics between the frequencies of both energy sources, a third electric field 124 is generated between the two live electrodes 90, 100. This third electric field is an additional source of energy between the first and second electric fields 120, 122, for supporting the plasma between the first and second gas passages. This third electric field 124 further prevents a backward reaction of the decomposed elements of the materials of the first type exiting the first electric field 120. The intensity of the third electric field 124 is adjustable by electrical means as explained above.

In this respect, it will be appreciated that when for example, the nominal voltages between each of the first and second live electrodes 90, 100 and the ground electrode 80 are a same voltage, but the alternating current of their respective energy sources are out of phase by an angle of about 18020 , the electrical potential between the two live electrodes 90, 100 is about twice as much as this nominal voltage.

It will also be appreciated that in many types of hazardous gas destruction operations, an intensity of this third electric field 124 of about between 20–25% the intensity of the first or second electric fields 120, 122 is sufficient to obtain the above-stated advantages. Therefore, for all intents and purposes, the electrically excitable distance referred to herein is less than about between 8 to 10 times a gap between any one of the live electrodes 90, 100 and the ground electrode 80.

The intensity of the third electric field 124 is also adjustable by mechanical means, as explained earlier, by moving the second live electrode 100 toward or away from the first live electrode 90, for calibrating the process with a variety of field voltages and frequencies.

As it was also mentioned earlier, the second zone of the apparatus of the exemplified embodiment is preferably intended for destroying materials having a higher bond energy, and being transformable into stable and less hazardous products. Therefore, the reagent inlet tube 110 has a discharge end 112 which is strategically located at the inlet end of the second gas passage for introducing a mate gas into this zone, and for controlling the chemical reaction occurring in this zone.

The discharge end 112 of the reagent inlet tube 110 is located amid the third electric field 124. The discharge end 112 of the reagent inlet tube 110 is also in close proximity of the first live electrode 90. The reagent inlet tube 110 is made of metal and is grounded to the casing 20 of the apparatus through the slip-through fitting 114 in the blank plate 32. The reagent inlet tubing 110 is adjustable towards and away from the first ground electrode 90 through the slip-through fitting 114.

Hence, when the discharge end 112 is in electrically excitable proximity from the first live electrode 90, a fourth electric field 126 is generated between the discharge end 112 of the reagent inlet tube 110 and the first live electrode 90.

The electrically excitable proximity referred to herein is about the same distance or less than a gap between the first live electrode 90 and the ground electrode 80.

The reagent gas flowing out of the discharge end 112 of the inlet tubing 110 flows through both electric fields 126 and 124, and is readily imparted with an intense electrical charge to ensure its instant bonding to the elements flowing through the second gas passage. In this respect, it has been found that a high efficiency of the reaction in the second zone has sometimes been observed when the discharge end 112 is spaced from the first live electrode 90, a distance where arcing is just about to occur.

When the reagent gas is oxygen for example, and the exhaust gas contains hydrogen, it is believed that the oxygen traversing both electric fields 126, 124 tends to form ozone which is more readily attractable to hydrogen to form water, than oxygen in its initial form.

Another feature of the apparatus of the preferred embodiment is that the tubular element 72 is smaller in diameter than the cylindrical element 60, and than the first live electrode 90. Hence, the velocity of the waste gas during the second gas passage is greater than the velocity of the waste gas through the first gas passage. The waste gas nearing the inlet end of the second gas passage is urged into an acceleration mode, thereby creating at that location, a region of lower pressure. When the waste gas is circulated under vacuum through the apparatus, the region of lower pressure is a region of increased vacuum.

The discharge end 112 of the reagent tube 110 is located at the inlet end of the second gas passage. The discharge opening of the reagent inlet tube 110 is oriented in a counterflow direction relative to the flow of gas entering the second gas passage. Therefore the reagent gas is readily homogenously diffused into the waste gas to be treated in the second zone, for improving the efficiency of the reaction occurring in this zone.

Figure 8:
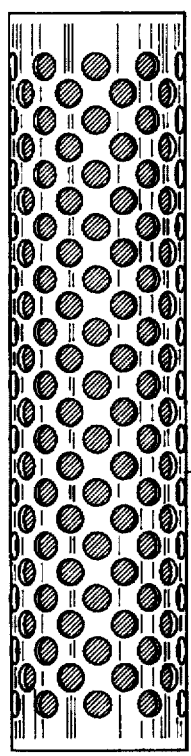
FIG. 8 is a side view of a perforated electrode for use as a first alternate embodiment of the second live electrode of the apparatus of the preferred embodiment.
Figure 9:
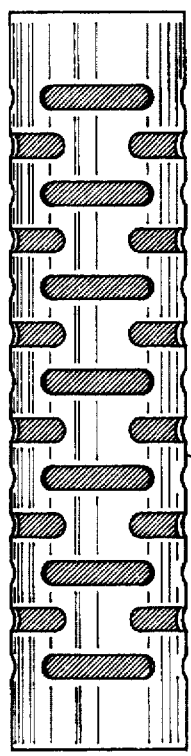
FIG. 9 is a side view of a slotted electrode for use as a second alternate embodiment of the second live electrode of the apparatus of the preferred embodiment.
Figure 10:
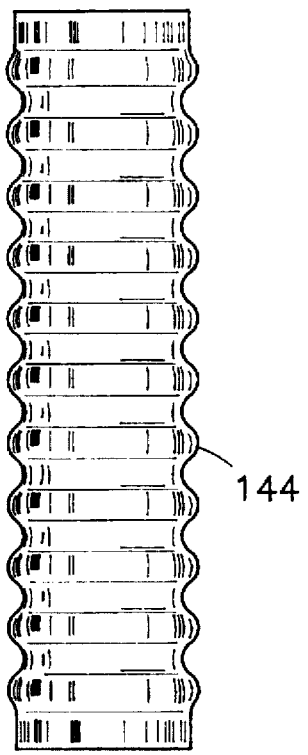
FIG. 10 is a side view of a corrugated electrode for use as a third alternate embodiment of the second electrode of the apparatus of the preferred embodiment.

Referring now to FIGS. 8, 9 and 10, there are illustrated therein three alternate embodiments of the second live electrode 100. The principal object of these alternate embodiments is for generating different types of corona discharge inside the second zone of the apparatus of the present invention. Although the following phenomena are not yet fully understood, one of the various corona effects generated by these electrodes may be preferable for inducing the chemical reaction of certain specific elements.

Accordingly, the object of the perforated electrode 140 illustrated in FIG. 8 is for stirring a waste gas normally flowing in a laminar mode, and for generating a corona discharge in the form of a plurality of radial energy spikes through the gas. The slotted electrode 142 illustrated in FIG. 9 is intended to produce energy beams across the flow path of a waste gas. This electrode is also intended to induce a turbulent flow in the second gas passage. The corrugated electrode 144 in FIG. 10 is intended to impart pulses of energy in a waste gas flowing there-along.

The apparatus of the preferred embodiment can thereby be used to precipitate contaminants, to oxidize contaminants or to transform contaminants into stable and less hazardous materials in a single operation. This is effected in a high energy plasma which is sustained throughout the entire process, and which is replenished with energy at propitious phases.

While the above description provides a full and complete disclosure of the preferred embodiment of this invention, various modifications, alternate constructions and equivalents may be employed without departing from the true spirit and scope of the invention. Such changes might involve alternate components, structural arrangements, construction features or the like. Therefore, the above description and the illustrations should not be construed as limiting the scope of the invention which is defined by the appended claims.

I claim:

1. An apparatus for treating hazardous compounds in a waste gas, comprising separate first and second zones, said first zone having a first live electrode and a ground electrode, said ground electrode comprising a first hollow shape defining a first compartment and a second compartment inside said first compartment; said first live electrode having a second hollow shape and being mounted inside said first compartment and enclosing said second compartment; said first compartment being spaced apart from said first live electrode and defining with said first live electrode a first gas passage having an upstream end and a downstream end;

means for exciting said first live electrode at a first electrical energy level for generating with said first compartment a first electric field in said first gas passage and for generating a plasma in said waste gas when said waste gas is flowing through said first gas passage;

said second zone having a second live electrode mounted inside and spaced apart from said second compartment and defining with said second compartment a second gas passage communicating with said downstream end of said first gas passage;

means for exciting said second live electrode at a second electrical energy level for generating with said second compartment a second electric field capable of sustaining said plasma in said waste gas when said waste gas is flowing through said second gas passage; and means for generating a third electric field between said second live electrode and said first live electrode when said first electrical energy level is different from said second electrical energy level for providing a complementary source of electrical energy between said first and second electric fields for sustaining said plasma between said first and said second zones.

2. The apparatus as claimed in claim 1 wherein said first gas passage has a first segment adapted to be oriented substantially downwardly and a second segment contingent with said first segment and being adapted to be oriented substantially upwardly, such that when said hazardous compounds are adapted to be precipitated in said first zone, particles containing said hazardous compounds are adapted to accumulate between said first and second segments.

3. The apparatus as claimed in claim 2 further comprising a openable cover for periodically removing said particles containing said hazardous compounds from said first zone.

4. The apparatus as claimed in claim 1 further comprising a first adjustable mounting means for supporting said second live electrode therein, and for varying a span between said first and second live electrodes.

5. The apparatus as claimed in claim 1 further comprising a reagent inlet tube having a discharge opening near said second gas passage, for introducing a reagent in said second gas passage for controlling a chemical reaction of said hazardous compounds in said second zone.

6. The apparatus as claimed in claim 5 further comprising means for generating a fourth electric field between said reagent inlet tube and said first live electrode and for enclosing said discharge opening within said fourth electrical field.

7. The apparatus as claimed in claim 6 wherein said discharge opening is located between said first gas passage and said second gas passage and is oriented in a counterflow direction relative to a flow path of said waste gas entering said second gas passage.

8. The apparatus as claimed in 6 further comprising a second adjustable mounting means for supporting said reagent inlet tube and for varying a span between said discharge opening and said first live electrode.

9. An apparatus for treating hazardous compounds in a waste gas, comprising separate first and second zones;

said first zone having a first live electrode and a ground electrode;

said ground electrode comprising an upright first cylindrical element having a first diameter, an upper edge and a lower edge, and also comprising an upright first tubular element having a second diameter, an upper end and a lower end, and further comprising a circular ring plate joining said lower edge of said first cylindrical element and said lower end of said first tubular element, said first diameter being larger than said second diameter such that said first cylindrical element and said first tubular element define a hollow cylindrical space having a bottom region near said circular ring plate;

said first electrode being an upright second cylindrical element having a third diameter, a closed high end and an opened low end, said third diameter being smaller than said first diameter, and being larger than said second diameter;

said first live electrode being positioned astride said first tubular element with said low end hanging at a distance from said circular ring plate, said first live electrode being spaced apart and defining with said first cylindrical element and said first tubular element a first gas passage having an upstream end and a downstream end;

means for exciting said first live electrode at a first electrical energy level for generating with said first cylindrical element and said first tubular element a first electric field in said first gas passage and for generating a plasma in said waste gas when said waste gas is flowing through said first gas passage;

said second zone having a second live electrode being mounted inside said first tubular element and being spaced apart from said first tubular element and defining with said first tubular element a second gas passage communicating with said downstream end of said first gas passage;

means for exciting said second live electrode at a second electrical energy level for generating with said first tubular element a second electric field capable of sustaining said plasma in said waste gas when said waste gas is flowing through said second gas passage; and means for generating a third electrical field between said second live electrode and said first live electrode when said first electrical energy level is different from said second electrical energy level for providing a complementary source of electrical energy between said first and second electric fields for sustaining said plasma between said first and said second zones.

10. The apparatus as claimed in claim 9 wherein said first live electrode defines with said first cylindrical element and said first tubular element respectively first and second segments of said first gas passage, with said first segment joining said second segment near said bottom region of said hollow cylindrical space, such that when said hazardous compounds are adapted to be precipitated in said first zone, particles containing said hazardous compounds are adapted to accumulate at said bottom region.

11. The apparatus as claimed in claim 10, wherein said second zone comprises a reagent inlet tube having a discharge opening near said second gas passage, for introducing a reagent in said second gas passage, further comprising means for generating a fourth electrical field between said reagent inlet tube and said first live electrode and for enclosing said discharge opening within said fourth electric field.

12. The apparatus as claimed in claim 11 wherein said discharge opening is located within said third electric field means.

13. The apparatus as claimed in claim 9 wherein said second live electrode is a second tubular element mounted inside said first tubular element and in coaxial relationship therewith, and said second gas passage is a region inside said first tubular element.

14. The apparatus as claimed in claim 9 further comprising an outer casing enclosing said first cylindrical element, and said outer casing having a removable cover for removing said first cylindrical element, said first tubular element and said circular ring plate from within said outer casing.

15. The apparatus as claimed in claim 14 wherein said first live electrode is suspended from an insulated conductor passing through said cover, and said insulated conductor comprises a circular dielectric plate disposed between said first live electrode and said cover for shielding said insulated conductor from said plasma.

16. An apparatus for treating hazardous compounds in a waste gas, having separate first and second zones;

said first zone having a first live electrode and a ground electrode, said ground electrode comprising a first hollow shape defining a first compartment and a second compartment inside said first compartment, said first live electrode having a second hollow shape and being mounted inside said first compartment and enclosing said second compartment; said first compartment being spaced apart from said first live electrode and defining with said first live electrode a first gas passage having an upstream end and a downstream end;

means for exciting said first live electrode at a first electrical energy level for generating with said first compartment a first electric field in said first gas passage and for generating a plasma in said waste gas when said waste gas is flowing through said first gas passage;

said second zone having a second live electrode mounted inside said second compartment and being spaced apart from said second compartment and defining with said second compartment a second gas passage communicating with said downstream end of said first gas passage; and means for exciting said second live electrode at a second electrical energy level for generating with said second compartment a second electric field capable of sustaining said plasma in said waste gas when said waste gas is flowing through said second gas passage;

said second gas passage being smaller in cross-section than said first gas passage such that when said waste gas is flowing out from said first gas passage and into said second gas passage, said waste gas is accelerated to generate a region of reduced pressure in said waste gas, between said first gas passage and said second gas passage;

said second zone comprising a reagent inlet tube having a discharge opening near said second gas passage, for introducing a reagent in said second gas passage, said reagent inlet tube having a discharge end located within said region of reduced pressure and being oriented in a counterflow direction relative to a flow path of said waste gas entering said second gas passage, such that during an operation thereof, a reagent flowing out of said reagent inlet tube is homogeneously dispersed into said waste gas entering said second gas passage.

17. The apparatus as claimed in claim 16 further comprising means for generating a reagent charging electric field between said reagent inlet tube and said first live electrode and for enclosing said discharge opening within said reagent charging electric field.

18. The apparatus as claimed in 17 further comprising an adjustable mounting means for supporting said reagent inlet tube and for varying a span between said discharge opening and said first live electrode.

19. The apparatus as claimed in claim 14 further comprising means for generating a bridging electric field between said second live electrode and said first live electrode when said first electrical energy level is different from said second electrical energy level for providing a complementary source of electrical energy between said first and second electric fields for sustaining said plasma between said first and said second zones.

20. The apparatus as claimed in claim 17 wherein said discharge end is located within said bridging electric field means.

* * * * *